Sept. 13, 1932.    I. L. PULLIAM    1,877,584
METHOD AND APPARATUS FOR WASHING AND LUBRICATING VEHICLES
Filed Sept. 10, 1928    2 Sheets-Sheet 1

Inventor
Ira L. Pulliam
By Lyon & Lyon
Attorneys

Sept. 13, 1932.  I. L. PULLIAM  1,877,584
METHOD AND APPARATUS FOR WASHING AND LUBRICATING VEHICLES
Filed Sept. 10, 1928    2 Sheets-Sheet 2

Inventor
Ira L. Pulliam
By Lyon & Lyon
Attorneys

Patented Sept. 13, 1932

1,877,584

UNITED STATES PATENT OFFICE

IRA L. PULLIAM, OF HUNTINGTON PARK, CALIFORNIA, ASSIGNOR TO RICHFIELD OIL COMPANY OF CALIFORNIA, OF LOS ANGELES, CALIFORNIA, A CORPORATION OF DELAWARE

METHOD AND APPARATUS FOR WASHING AND LUBRICATING VEHICLES

Application filed September 10, 1928. Serial No. 304,884.

This invention relates to a method of washing, lubricating and greasing vehicles such as automobiles and the like and to an apparatus whereby such washing, greasing and lubricating operation may be most effectively carried out. The invention particularly relates to a combination and arrangement of elements whereby a large number of vehicles may be greased, lubricated and washed within a short period of time and upon a minimum area.

A feature of this invention is the sequence in which the various operations are carried out, making it possible to employ effectively a large number of men in the most productive manner and operating upon vehicles so as to produce the most effective results.

Various systems have been invented and are in operation for washing vehicles, particularly automobiles, and automobile washing operations and devices have been perfected so that the washing operation may be carried out in a very short period of time; still there has not been available a system whereby automobiles could be washed, greased and lubricated efficiently. For example, it has been customary to lubricate and grease a vehicle and then wash the vehicle. During such subsequent washing, large quantities of lubricant are rendered uneffective as they are washed out during the washing operation. For example, a freshly greased and lubricated automobile, when subsequently washed, will have large quantities of oil and grease removed from exposed portions, such as springs, crevices in the body and chassis, shackle bolts and exposed portions of the steering gear. In other words, a car which has been just greased and lubricated, and then washed, will be delivered in an imperfect condition in that squeaks will still be present in the body and exposed members.

When the vehicle is first washed and then greased and lubricated, there is a decided tendency to deliver the car in a dirty condition because of the handling of the vehicle during the greasing and lubricating operation. Furthermore, I have found that a greasing operation, followed by a subsequent washing operation, or a washing operation followed by a subsequent greasing operation, renders it impossible to employ an effective number of men in the most efficient manner, and the combination of these two operations in such order necessitates the expenditure of a relatively long period of time in order to produce a completely washed, lubricated and greased vehicle.

An object of this invention is to provide means whereby a large number of vehicles may be completely washed, lubricated and greased in a minimum period of time.

Another object is to provide means whereby vehicles may be completely greased, lubricated and washed rapidly and upon a minimum area.

Another object is to disclose an arrangement and combination of elements occupying a minimum area and adapted to completely wash, lubricate and grease a large number of vehicles within a given period of time.

Another object is to provide a method whereby greasing, lubricating and washing operations may be carried out upon vehicles in the most effective manner.

A still further object is to provide a method whereby a large number of men may be employed in washing and lubricating vehicles, such operations being carried out in a particular sequence.

For purposes of illustration, the detailed description hereinafter given will relate particularly to the washing, greasing and lubricating of automobiles, although it is to be understood that other types of vehicles may have these operations performed thereon by means of my method and by the use of devices hereinafter disclosed. In describing the method embraced by my invention, references shall be had to one form of apparatus shown in the appended drawings in which said method may be carried out.

In general the apparatus and arrangement of elements embraced by my invention may consist of a plurality of longitudinal tracks 1 for vehicles, such tracks being made of channel iron or of any other suitable guide members. The longitudinal tracks 1 are preferably provided with pits 2 between adjoining tracks and with pits 3 between the tracks themselves. Pits 2 and 3 may be continuous, and of such depth as to enable workmen standing upon the floor 4 to readily come in contact with, and operate upon, the lower portions of the vehicles. The depth of the pits 2 and 3 may vary from 2 to about 4 feet.

Figure 4:
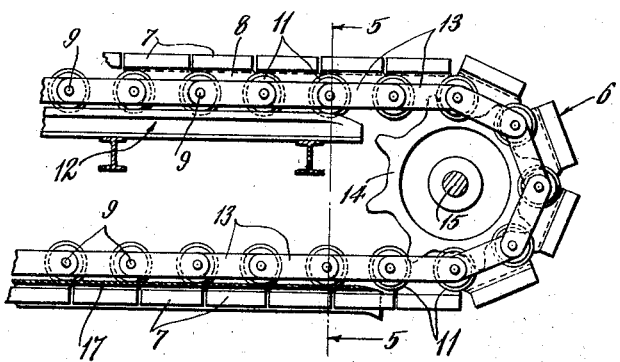
Figure 4 is an enlarged vertical section taken along line 4—4 of Figure 1.
Figure 5:
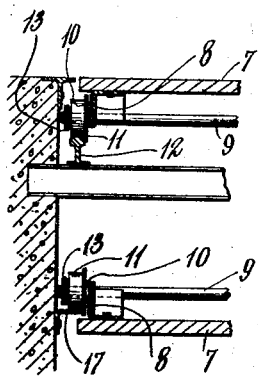
Figure 5 is a vertical section taken along line 5—5 of Figure 4.

The longitudinal vehicle tracks 1 preferably lead to a transverse vehicle carrying and conveying means such as, for example, two continuous conveyors 5 and 6 spaced sufficiently from each other so that a vehicle may be positioned with its front wheels upon conveyor 6 and the rear wheels upon conveyor 5. One form which may be assumed by the conveyors 5 and 6 is shown in Figures 4 and 5. The conveyors may consist of a series of slats 7 provided with lugs 8 attached thereto adjoining slats 7, being connected together by means of shafts 9 passing through suitable apertures in the lugs 8, the lugs 8 being adapted to overlap each other so that the shaft 9 may pass through apertures in a lug 8 and through a similar aperture in a lug 10 connected to the adjoining slat 7. The shafts 9 may bear small wheels 11 adapted to run upon tracks 12 positioned beneath the upper portion of the conveyor. Furthermore, the adjoining shafts 9 may be connected together by means of links 13 in which the shafts 9 are journaled.

The conveyors may pass over suitable sprockets 14 mounted upon shafts 15, one of said shafts 15 at one end of the conveyors 5 and 6 being connected by suitable gearing to a motor 16 adapted to drive the shaft 15 and the conveyors 5 and 6. The lower portion of the conveyor may be supported by means of angle irons 17 mounted upon the sides of the pits in which the conveyor returns, and adapted to support the conveyor by allowing the wheels 11 to ride along the rail formed by the angle iron 17. It will be noted that conveyors 5 and 6 are preferably driven from the same shaft 15, and means are provided, although not shown in the drawing, for controlling the motor 16; such means should preferably include means for reversing the direction of travel of the conveyors 5 and 6.

The conveyors 5 and 6 extend past the plurality of longitudinal tracks 1 and near the end of said travel of the conveyors 5 and 6 pits are provided between the conveyors 5 and 6 and beyond said conveyors. Preferably such pits are provided with vehicle supports 18 and 19, the vehicle supports 18 being illustrated as being placed between the conveyors 5 and 6 while the vehicle supports 19 are beyond the conveyor, or at the side thereof, but in alignment with the vehicle supports 18. Pits are preferably provided between the vehicle supports 18 and 19, such as the pit 20, and beside or adjoining the vehicle supports, such as the pits 21. Furthermore, these pits are preferably provided with vertically movable floors 22 and 23.

Means for moving the floors 22 and 23 within pits 20 and 21 may comprise vertical cylinders 24 and 25 connected to the floors 22 and 23, the cylinders 24 and 25 being received in suitable bearings 26 and 27 positioned in pits 28 and 29 formed in the bottom of pits 20 and 21 respectively. The cylinders 24 and 25 are adapted to receive pistons 30 and 31 carried upon the ends of stationary hollow cylindrical members, or rods, 32 and 33. Fluid may be admitted to the cylinders 24 and 25 above the pistons 30 and 31 from a main line 34 adapted to supply a fluid to the hollow rods 32 and 33 through suitable valves 35, 36 and 37 which may be operated through suitable means extending to a central control tower or box. The fluid is supplied to lines 32 and 33 from the main feed line 34, which may be connected with a source of pressure fluid, not shown, such as, for example, a surge tank containing a liquid under pressure or a source of compressed air or other gas. The admission of fluid under pressure into the cylinders 24 and 25 above the pistons 30 and 31 will cause the floors 22 and 23 to be raised. Closure of the valves 35, 36 and 37 will maintain the floors 22 and 23 in any desired position, and the opening of relief valves adapted to liberate the fluid from the cylinders 24 and 25 will cause the floors 22 and 23, together with the cylinders 24 and 25 respectively, to be lowered into any desired position. The relief valves are not shown in the drawing as the means for raising and lowering the floors and the like by use of fluids under pressure is well known in the art.

Figure 1:
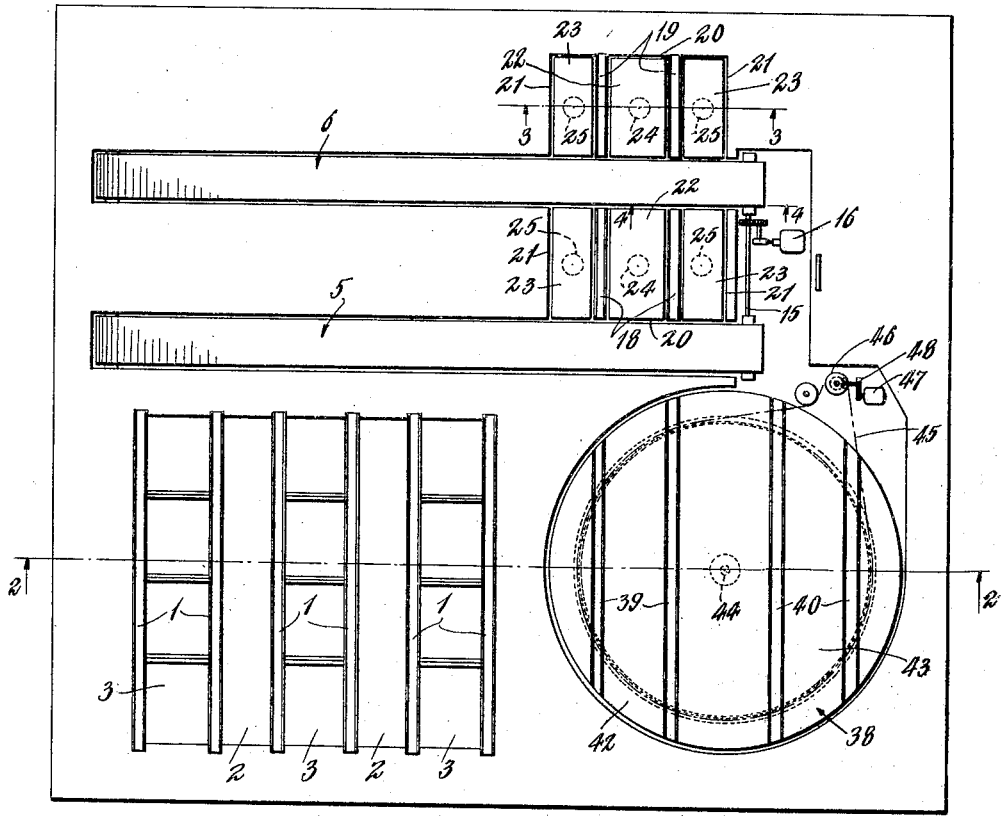
Figure 1 is a plan view of a vehicle washing, cleaning and lubricating apparatus and system placed upon a portion of an ordinary city lot.
Figure 2:
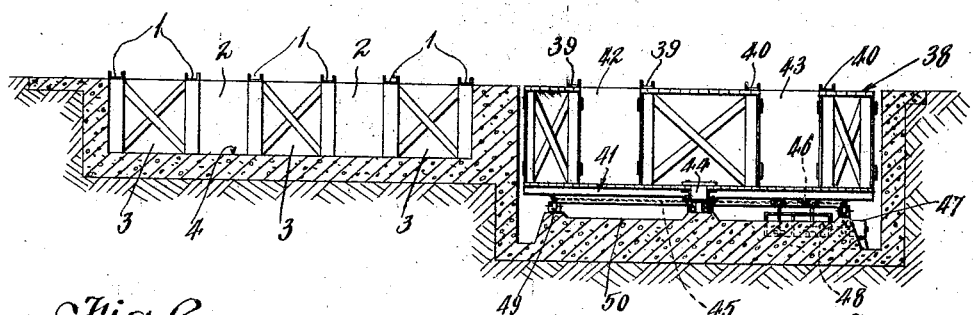
Figure 2 is a vertical section taken through the aparatus shown in Figure 1 along line 2—2.
Figure 3:
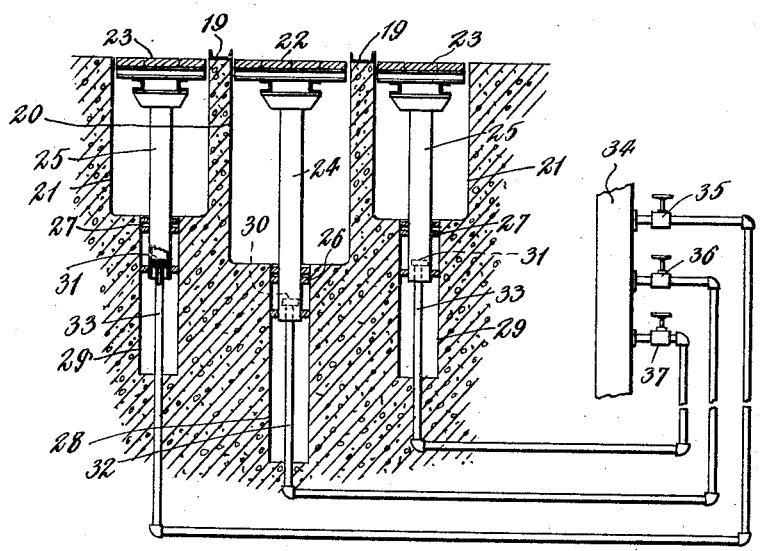
Figure 3 is an enlarged vertical section of the apparatus taken along the line 3—3 of Figure 1.

Turn table means 38 are provided and placed in such position with respect to the conveyors 5 and 6, and particularly with respect to the vehicle supports 18 and 19 that a vehicle may be moved from the vehicle supports 18 and 19 directly on to vehicle guides 39 mounted upon the turn table means 38. As shown in Figures 1 and 2, the turn table means 38 are preferably provided with two vehicle guides and supports, 39 and 40. One of said supports being in direct alignment with the vehicle supports 18 and 19. The turn table means 38 may comprise a base 41 adapted to support the vehicle guides 39 and 40 so that pits 42 and 43 are formed beneath the vehicle supports 39 and 40. The turn table means 38 rotate upon a central pivot 44 provided with suitable bearings and rotation about the pivot 44 may be accomplished by means of a continuous chain 45 passing around a suitable frame-work attached to the base 41 of the turn table means and around a sprocket or other suitable driving member 46 which may be driven in any suitable manner such as, for example, by means of the motor 47 and a suitable gearing 48. The base 41 of the turn table is also preferably provided with rollers or with a rail adapted to rest upon rollers 49 circularly disposed upon the bottom 50 of the pit in which the turn table means are positioned. It is not believed that details of construction relating to the turn table means are required as numerous changes and modifications well within the scope of the art may be made therein, and only the desirable features, namely, the provision of pits 42 and 43 beneath the vehicle supports 39 and 40 being more or less essential.

In accordance with my method, and in using the apparatus hereinabove described, vehicles such as automobiles are first placed upon the longitudinal tracks 1 and interior or unexposed portions thereof thoroughly lubricated and greased. For example, the crank case may be drained and fresh oil admitted, differential and transmission greased and certain portions of the motor lubricated. Operators may be positioned in the pits 2 adjoining the vehicles, or also in the pits 3 beneath the vehicles. Slidable floors may be provided on a level with the vehicle guides so as to enable operators to lubricate the motor or upper portions of the vehicle simultaneously.

After the unexposed portions of the vehicle have been lubricated, it may then be moved forward along its longitudinal axis on to the conveyors 5 and 6. The conveyors 5 and 6 are spaced a sufficient distance apart to enable the rear wheels of an automobile to rest upon the conveyor 5 while the front wheels rest upon the conveyor 6. If desired, however, a single large conveyor may be used. The vehicle is then moved transversely to its longitudinal axis by a simultaneous operation of the conveyors 5 and 6. If the vehicle supports 18 and 19 are not filled, then the vehicle may be moved by means of the conveyors 5 and 6 until it assumes a position in alignment with the supports 18 and 19, and the vehicle then moved longitudinally upon the supports 18 and 19, straddling the conveyor 6. If a single wide conveyor is used instead of the two conveyors 5 and 6, then the vehicle is entirely removed from the conveyor and assumes a position upon a support 19 beyond said conveyor.

The vehicle while at rest upon the supports 18 and 19 is thoroughly washed, operators positioned upon the movable floors 22 and 23 being permitted to come in contact with the under portions of the vehicle. If desired, an operation preliminary to the actual washing may take place upon the longitudinal tracks 1, such as for example, the application of a softening fluid to the vehicle so as to facilitate the removal of adhering mud and other foreign matter during the subsequent washing operation.

After the vehicle has been washed, while in position upon the supports 18 and 19, it is then moved longitudinally upon the supports 39 mounted upon the turn table means 38. Operators on said turn table may then dry and finish cleaning the vehicle while exposed portions of the vehicle are being simultaneously lubricated, for example, operators positioned in pit 42 beneath the supports 39 may spray the springs with oil and lubricate the exposed portions of the automobile, such as shackle bolts, steering yokes, and axle bearings, which have become wet during the washing operation. During such final cleaning and lubricating operations performed on the turn table 38, the turn table may be rotated so as to place the vehicle supports 40 in alignment with the vehicle supports 18 and 19, thereby permitting the discharge of the vehicle from supports 39 in a forward direction and allowing another vehicle to be placed upon the turn table means 38 in position on supports 40.

It is to be understood that various changes and modifications may be made in the construction and details of the various elements entering into the apparatus herein disclosed without departing from the inventive conception. It is to be further understood that various means for supplying water, oil, steam, and cleaning solutions to the various elements and sections of the apparatus may be provided in accordance with well known means and arrangements. The method herein described, however, may only be slightly modified as to the extent or degree to which the vehicle is lubricated or greased in the first operation, it being quite essential that the two lubricating steps be separated by an intermediate washing or vehicle-cleaning operation.

I claim:

1. A vehicle washing and lubricating system comprising a continuous conveyor adapted to move vehicles in a direction transversely to their longitudinal axes, a plurality of tracks for vehicles leading to said means, pits between said tracks, and a turn table means adjoining said vehicle moving means and adapted to receive vehicles therefrom.

2. A vehicle washing and lubricating system comprising two spaced parallel continuous conveyors adapted to receive and move vehicles in a direction transversely to their axes, a pit adjoining said conveyors and near the end thereof, a plurality of tracks for vehicles leading to said conveyors, pits between said tracks, turn table means adjoining said vehicle moving means and adapted to receive vehicles therefrom, said turn table means being provided with pits below vehicle receiving means carried thereby.

3. A vehicle washing and lubricating system comprising two spaced parallel continuous conveyors adapted to receive and move vehicles in a direction transversely to their axes, means for driving said conveyors in unison, a pit adjoining said conveyors and near the end thereof, a vertically movable floor in said pit, fluid operated means for moving said floor, a plurality of tracks for vehicles leading to said conveyors, pits between said tracks, and means adapted to receive vehicles from said conveyors and in line with the pits adjoining said conveyors.

4. A vehicle washing and lubricating system comprising a plurality of longitudinal tracks for vehicles, pits between said tracks, two transversely extending spaced continuous conveyors adapted to receive vehicles from said tracks and adapted to move vehicles transversely to their longitudinal axes, controllable means for activating said conveyors simultaneously, longitudinal vehicle guides between said transverse conveyor, longitudinal vehicle guides aligned with last named guides and positioned beyond said conveyors, pits between said guides, vertically movable floors in said pits, fluid operated means for moving said floors, a turntable means positioned near said longitudinal vehicle guides and adapted to receive vehicles therefrom, vehicle supports carried by said turntable means, a pit between said vehicle supports and carried by said turntable, and means for rotating said turntable means.

5. A vehicle washing and lubricating system comprising a plurality of longitudinal tracks for vehicles, pits between said tracks, two transversely extending spaced continuous conveyors adapted to receive vehicles from said tracks and adapted to move vehicles transversely to their longitudinal axes, controllable means for activating said conveyors simultaneously, longitudinal vehicle guides between said transverse conveyors, longitudinal vehicle guides aligned with last named guides and positioned beyond said conveyors, pits between and adjoining said guides, vertically movable floors in said pits, fluid operated means for moving said floors, a turntable means positioned near said longitudinal vehicle guides and adapted to receive vehicles therefrom, two vehicles supports carried by said turntable means, a pit between said vehicle supports and carried by said turntable, and means for rotating said turntable means to bring one of said vehicle supports in alignment with said longitudinal vehicle guides.

6. A vehicle washing and lubricating system comprising a plurality of trackways overlying servicing positions, said trackways being adapted to receive and guide vehicles, means adapted to receive vehicles from said trackways and move said vehicles laterally, a trackway at right angles to the direction of movement of said last named means adapted to receive and support a vehicle, and a vertically movable floor adjoining said trackway.

7. A vehicle washing and lubricating system comprising a plurality of trackways overlying a pit adapted to receive and guide vehicles longitudinally, means adapted to receive vehicles from said trackways, said means being adapted to move vehicles laterally, a separate trackway at right angles to the direction of movement of said last named means adapted to receive and support a vehicle, a vertically movable floor adjoining said separate trackway, and a turntable in alinement with said last named trackway.

8. A vehicle washing and lubricating system comprising a plurality of trackways overlying a pit adapted to receive and guide vehicles longitudinally, means adapted to receive vehicles from said trackways, said means being adapted to move vehicles laterally, a separate trackway at right angles to the direction of movement of said last named means adapted to receive and support a vehicle, a vertically movable floor adjoining said separate trackway, and a turntable adjacent to said first named trackways, said turntable bearing two pairs of trackways either of which may be placed in alinement with said separate trackway.

9. A vehicle washing and lubricating system comprising means for moving vehicles in a direction transversely to their longitudinal axes, means for driving said vehicle moving means, a plurality of tracks for vehicles leading to said vehicle moving means, pits between said tracks, and turntable means adjacent to said tracks, said turntable bearing two pairs of adjacent trackways, each trackway on one side of said turntable, either of which being adapted to receive vehicles from said vehicle moving means.

10. In a vehicle washing and lubricating system, two spaced parallel continuous conveyors adapted to receive front and rear wheels of a vehicle respectively and to move said vehicle transversely, means for driving said conveyors in unison, a trackway at right angles to said conveyors positioned between said conveyors, an extension of said trackway beyond one of said conveyors, said trackway and extension being adapted to receive a vehicle from said conveyors and support the vehicle while straddling one of said conveyors.

11. In a vehicle washing and lubricating system, two spaced parallel continuous conveyors adapted to receive front and rear wheels of a vehicle respectively and to move said vehicle transversely, means for driving said conveyors in unison, a trackway at right angles to said conveyors positioned between said conveyors, an extension of said trackway beyond one of said conveyors, said trackway and extension being adapted to receive a vehicle from said conveyors and support the vehicle while straddling one of said conveyors, and a vertically movable floor adjoining said trackway and extension.

12. In a vehicle washing and lubricating system, two spaced parallel continuous conveyors adapted to receive front and rear wheels of a vehicle respectively, and to move said vehicle transversely, means for driving said conveyors in unison, a pit between said conveyors and extending transversely beyond one of said conveyors, a trackway at said pit between said conveyors, an extension of said trackway in alinement therewith at said pit beyond one of said conveyors, said trackway and extension being adapted to receive a vehicle from said conveyors and support the vehicle while straddling one of said conveyors, and a vertically movable floor in said pit adjoining said trackway and extension.

13. A vehicle washing and lubricating system comprising means for moving vehicles in a direction transversely to their longitudinal axes, a plurality of adjacent tracks for vehicles leading to one end portion of said vehicle moving means, said tracks extending in a direction substantially at right angles to the direction of movement of said vehicle moving means, and turntable means adjacent said tracks and adapted to receive vehicles from said vehicle moving means.

14. A vehicle washing and lubricating system comprising means for moving vehicles in a direction transversely to their longitudinal axes, a plurality of tracks for vehicles leading to one end portion of said vehicle moving means, said tracks extending in a direction substantially at right angles to the direction of movement of said vehicle moving means, pits between said tracks, and a turntable means adjacent said tracks and adapted to receive vericles from said vehicle moving means.

15. A vehicle washing and lubricating system comprising means for moving vehicles in a direction transversely to their longitudinal axes, means for driving said vehicle moving means, a plurality of adjacent tracks for vehicles leading to said vehicle moving means, said tracks extending in a direction substantially at right angles to the direction of movement of said vehicle moving means, pits between said tracks, turntable means adjacent said tracks and vehicle moving means and adapted to receive vehicles from said vehicle moving means, and means for rotating said turntable means.

Signed at Los Angeles, California, this 4th day of September, 1928.

IRA L. PULLIAM.